United States Patent [19]
Jensen

[11] 3,894,293
[45] July 8, 1975

[54] OBJECT LOCATOR SYSTEM WITH AUTOMATIC SENSITIVITY REDUCTION FOR LARGE SIGNALS

[75] Inventor: Garold K. Jensen, Alexandria, Va.

[73] Assignee: The United States of America as represented by the Secretary of the Navy, Washington, D.C.

[22] Filed: Jan. 29, 1963

[21] Appl. No.: 255,726

[52] U.S. Cl. .................................. 343/8; 343/7.7
[51] Int. Cl.² ...................... G01S 9/42; G01S 9/44
[58] Field of Search .................. 343/7.7, 8, 9, 17.1; 340/15.5 A

[56] References Cited
UNITED STATES PATENTS

| | | | |
|---|---|---|---|
| 2,558,868 | 7/1951 | McCarty | 340/15.5 A |
| 2,848,713 | 8/1958 | Cowartt | 343/8 |
| 3,140,486 | 7/1964 | Gillmer | 343/8 |
| 3,149,333 | 9/1964 | Campbell | 343/17.1 |

Primary Examiner—Malcolm F. Hubler
Attorney, Agent, or Firm—R. S. Sciascia; Arthur L. Branning

EXEMPLARY CLAIM

2. In a velocity sensitive type radar system,
   a plurality of frequency selective filters for separating on a basis of frequency the radar return signals which are shifted in frequency as a result of motion of objects producing the return signals,
   a plurality of variable gain signal transmission means, one for each filter and each individually connected to a filter, each transmission means including a diode network which is conductive only in response to a small amplitude output signal from said connected filter, each transmission means further including variable gain amplification means for providing said transmission means output signal and controlled by said diode network to provide large amplification of the output signal from said connected filter when said diode network is conductive and to provide lesser amplification of the output signal from said connected filter when said diode network is not conductive
   and means for combining the outputs of the plurality of transmission means into a single output channel for the radar system indicator.

2 Claims, 3 Drawing Figures

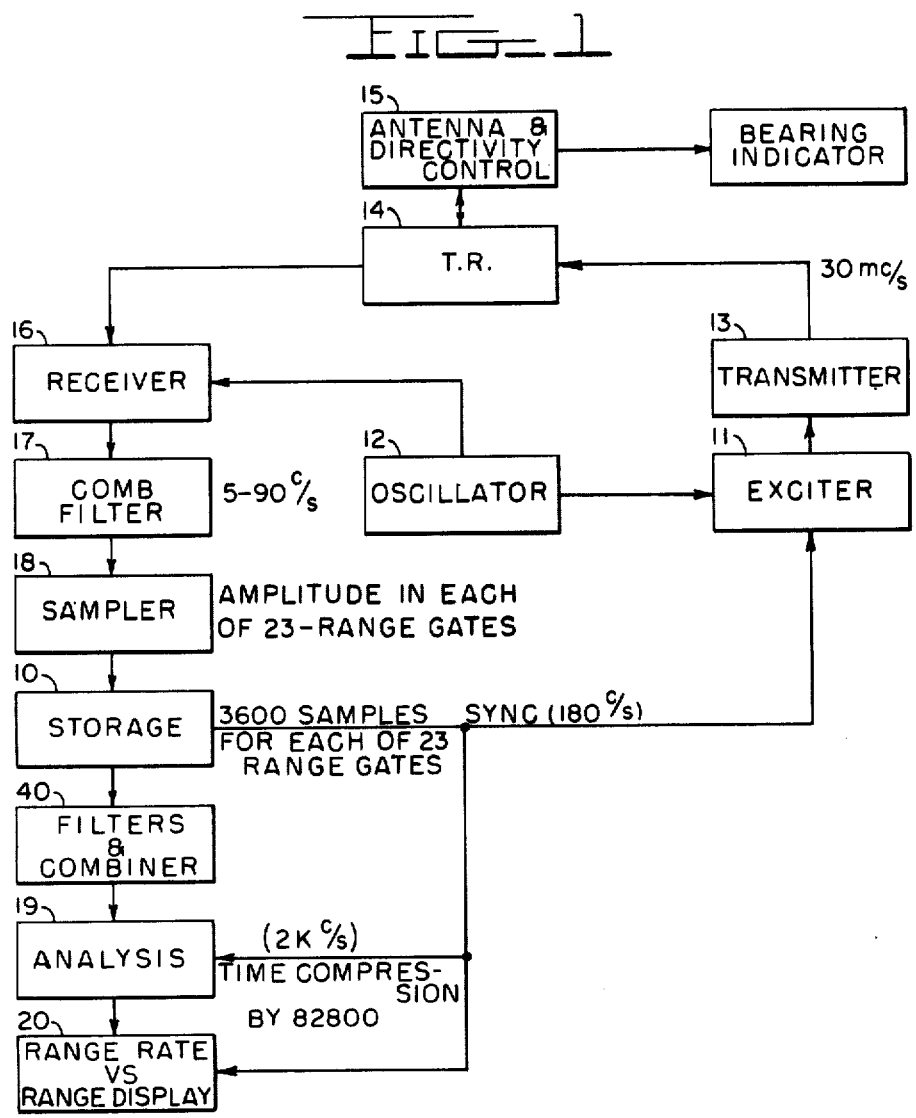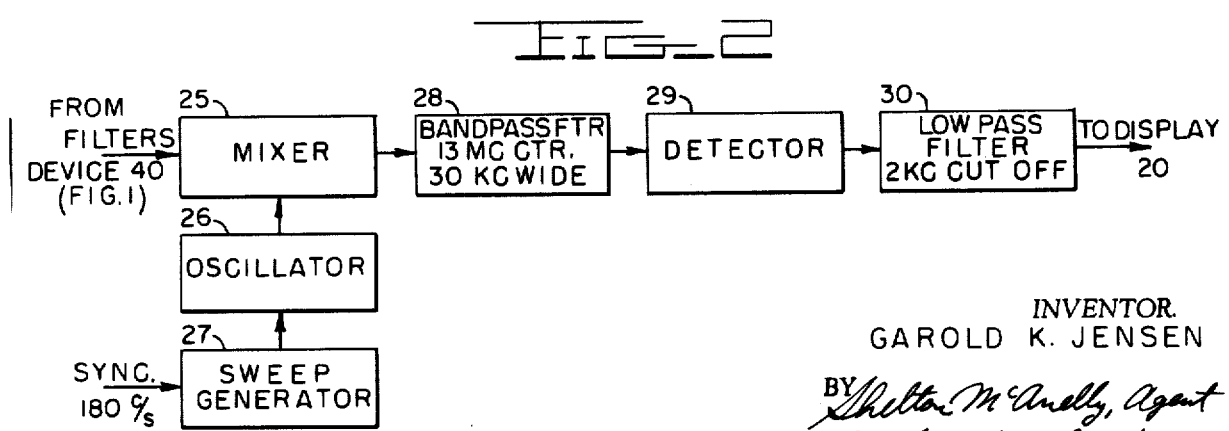

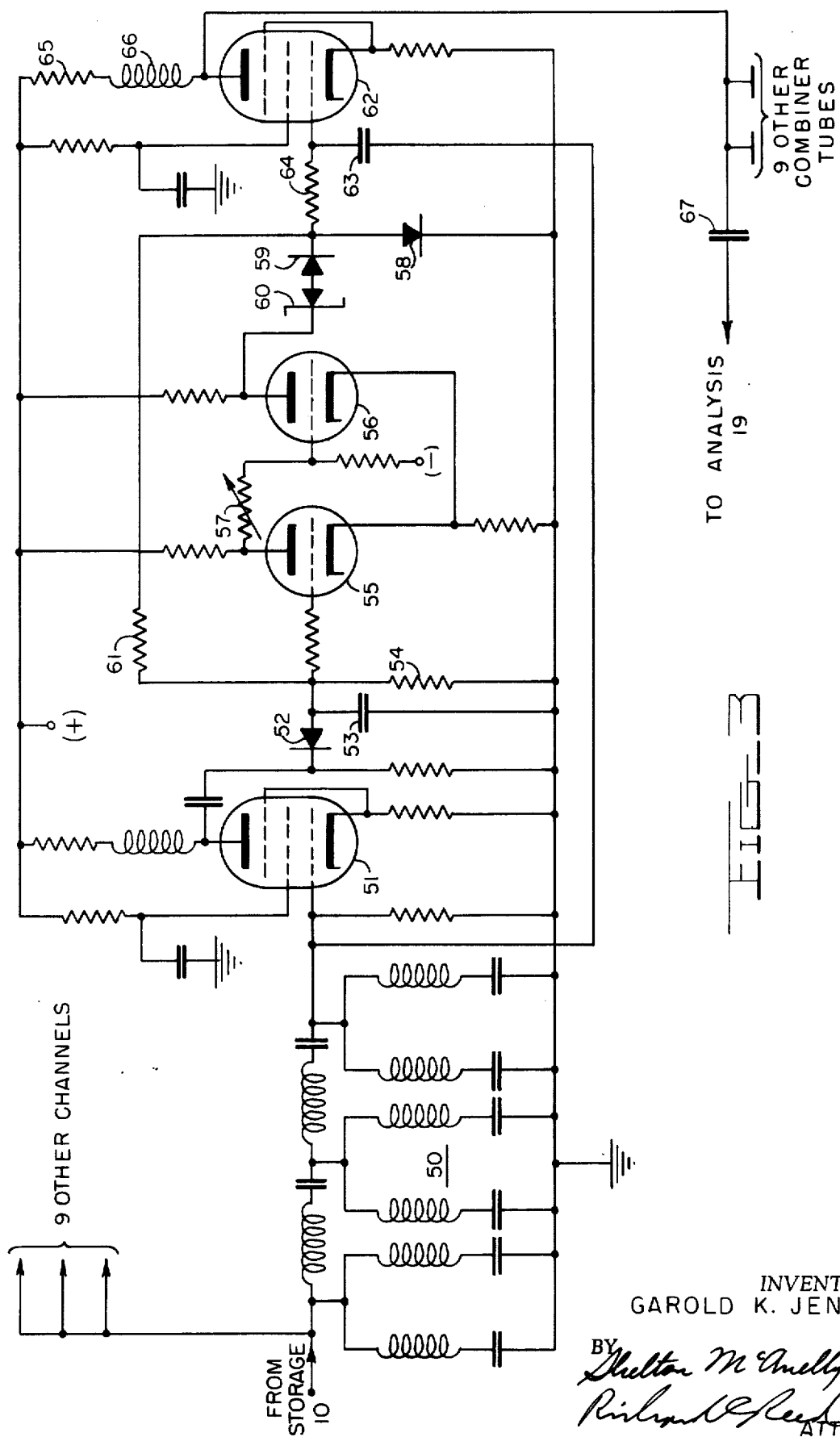

OBJECT LOCATOR SYSTEM WITH AUTOMATIC SENSITIVITY REDUCTION FOR LARGE SIGNALS

The invention described herein may be manufactured and used by or for the Government of the United States of America for governmental purposes without the payment of any royalties thereon or therefor.

This invention relates to object detecting systems in general and in particular to electronic devices of the type identified as radar. In further particularity it relates to correlating systems wherein short duration pulse echo signals occurring at wide time spacing during a period of time are stored and reproduced with a minimum of time spacing so as to achieve certain effects of a continuous signal, such as reduced bandwidth.

This invention is an improvement over the copending application of Garold K. Jensen, Ser. No. 53,312, filed Aug. 31, 1960 for OBJECT LOCATOR SYSTEM. It is not limited to use in that prior system however, because it is broadly applicable to any velocity sensitive radar type system. The present invention seeks to provide enhanced detection capabilities for a long range radar system in the presence of strong return signals primarily due to large nearby energy reflective objects. Although the large nearby target situation is not a new problem in radar, it is present in a new form in the devices of my copending application partly as a result of the vastly improved detection capabilities of that system and partly as a result of certain peculiarities of that system which provide the enhanced detection capabilities. The prior system is so sensitive that satisfactory operation at ranges of the order of 2000 miles is commonplace even for targets of relatively small effective target proportions such as ballistic missiles. Such long ranges of operation, however, normally seriously limit the pulse repetition frequency that can be employed without encountering ambiguity due to the receipt of return energy resultant to previous pulses in the period following a penultimate pulse and prior to the occurrence of a last pulse.

In general, low pulse repetition frequencies are undesired, particularly where the typical ballistic missile targets are concerned because such low pulse repetition frequencies provide considerable time spacing so that fast moving targets can travel a long distance and vary considerably in velocity from pulse to pulse making it more difficult to provide the acceleration compensation of the prior application. Thus, a typical system of the prior application includes a pulse repetition rate providing an unambiguous range of 450 nautical miles which means that there will be three foldovers for ranges out to 1800 nautical miles and the consequent masking of one range gate and range rate gate combination in each range foldover by a strong target in the first range interval. This basic PRF problem is further complicated by the fact that the acceleration gate system of the prior application will tend to spread the strong target signal over a number of range rate gates and acceleration gates due to the modulation of the variable oscillator in accordance with the acceleration functions.

It is frequently possible for actual installations of apparatus in accordance with the prior system to be made so as to substantially avoid large near range targets because that system is basically sensitive only a moving targets, and slowly moving targets or clutter due to motion of the apparatus on board a ship can be filtered out without seriously impairing detection of fast moving targets. In such cases there will be no difficulties of the type sought to be eliminated by the present apparatus, however, to extend the utility of the prior system by making it less adversely affected by strong near range signal echoes, which could be produced by decoys, for example, it is desirable to provide the improvements fo the present application.

It is accordingly an object of the present invention to provide improved operation of a radar system employing acceleration gating and signal storage when that system encounters strong signal echoes.

Another object of the present invention is to provide apparatus for reducing the effective amplitude of large signals to avoid masking of small signals by said large signals.

Other objects and many of the attendant advantages of this invention will be readily appreciated as the same becomes better understood by reference to the following detailed description when considered in connection with the accompanying drawings wherein:

FIG. 1 shows in block form basic structure of the above-identified prior application as modified by the addition of a block containing apparatus incorporating into the overall system the teachings of the present invention.

FIG. 2 shows additional details of the analysis channel 19 of FIG. 1.

FIG. 3 shows typical schematic detail of apparatus suitable for component 40 of FIG. 1.

In the apparatus of the application above identified, return pulse signals of short duration are modified by storage and playback and filtered to appear as narrow band-width long duration signals. This results from the method of placement of the signals in the storage device and the manner of playback of signals with phase coherence and in rapid succession, the actual time intervals separating the original pulses being effectively compressed to provide a substantial improvement in the signal to noise ratio. An important aspect of the prior application was the preservation of the improved signal to noise ratio despite a rapid shift in frequency of return signals from fast accelerating objects by employing a heterodyning step in which the return signals were altered in frequency according to a prearranged pattern. By trying many different alteration patterns characteristic of the normal varieties of targets encountered it was possible to achieve an acceleration matching condition in which a substantially uniform difference frequency resulted despite variations in the range rate due to rapid acceleration of objects to be detected.

In that prior system, a pulse repetition frequency was selected which provided a pulse-to-pulse time separation equal to the two-way transit time for 450 mile range. When range foldover occurs due to the receipt of usable echoes from targets out to a typical 1800 miles, close objects in the first range interval will occur in the same range gate with targets at each additional 450 mile range and will not be eliminated by the range rate so that targets in the additional range intervals falling in the same range rate gate as those of the first range interval will be masked by the strong nearby signals. Hence, a large amplitude target at close range in the first fold will obscure the normally much smaller targets occurring at the same range rate at each additional 450 mile range. According to the principles of the present invention, this is avoided by employing a plurality of filters to subdivide range rate into a plurality of channels each of which is provided with a very special form of fast acting automatic gain control system so that only the affected range rate channels are rendered self blocking during the occurrence of large amplitude signals. With a typical quantity of 10 such self-controlling channels it is possible to reduce the blanking at various multiples of range by a very substantial degree.

With reference now to FIG. 1, the apparatus shown therein is primarily a reproduction of basic apparatus of the prior application in which signals produced by transmitter 13 are emitted by antenna 15 so that upon return, as by reflection from a distant object, energy is intercepted by antenna 15 and delivered through T.R. switch 14 to receiver 16. Receiver 16 utilizes an oscillator 12 which is also operative for transmitter 13 to maintain coherence in operation of the transmitter and receiver. Received signals are filtered in a special way in comb filter 17, sampled by sampler 18 and stored in storage 10 so that signals from 3600 successive transmitted pulses are present at all times to be played back in rapid succession to provide a reduction in the noise accompanying such signals because of the bandwidth reduction permitted by the long duration resultant signals. In the original apparatus of the prior invention, output signals from the storage device 10 were delivered directly to the analysis device 19 which was followed by the range rate vs. range display device 20. In the device of the present invention, however, component 40, labeled "Filters and Combiner", is inserted between the storage 10 and analysis 19 to subdivide the Doppler frequency output signal from storage 10 having a typical frequency range of 0.4 to 7.5 megacycles per second into a plurality of channels, say 10. These channels have individual automatic gain control features whereby large amplitude signals therein can be drastically reduced to minimize masking of more distant signals occurring at multiples of the 450 mile range established by the pulse repetition frequency of the transmitter 13.

Since the structure of the analysis component 19 of FIG. 1 was an extremely important aspect of the prior application, a block diagram of typical structure of such analysis 19 is included in the present application as FIG. 2. In this device as was originally intended, output signals from the storage device 10 are presented to a mixer 25 where they are combined with signals obtained from oscillator 26 controlled by sweep generator 27 which purposely provides a sweeping in the frequency of oscillator 26 over a variational pattern determined by the sweep generator 27. Thus the output from the mixer 25 is held substantially constant for an energy reflective object having a rapidly varying range rate or acceleration which produces a Doppler frequency signal whose variation pattern corresponds to the variation pattern as the output of sweep generator 27. It is thus possible by the selection of the proper characteristic of the output of sweep generator 27 or by trying many patterns in sequence to find a pattern which holds the output of mixer 25 substantially constant despite large variations in the range rate of the distant target. This signal, then, which is of substantially constant frequency and hence can be passed by a narrow band filter 28 for elimination of attendant noise is detected in detector 29 and filtered in lowpass filter 30 for delivery to display device 20.

Typical structure of Filter and Combiner apparatus 40 of FIG. 1 is shown in FIG. 3 which indicates in schematic form ten typical channels which are identical except for the frequency of the input filter and which are placed substantially in parallel. FIG. 3 shows only one channel in detail.

The output signal from storage device 10 as previously described is a signal which is in the frequency range of 0.4 to 7.5 megacycles per second depending upon the range rate of the various targets involved and is identified as a sinusoidal burst signal, in other words, one which is of a pulse modulated sinusoid form. It is desired to emphasize that this signal is not a typical rectified or unipolar video signal as is familiar in television practice. This signal is selected by the bandpass filter 50 which as shown contains a plurality of inductance and capacitance components which will be recognized as a typical form of bandpass circuit having desirable characteristics as regards steepness of slope and phase shift at the limits of the passband and so forth. Each of the other 9 channels indicated will have a filter such as 50 tuned to a different passband so that together the entire combination of 10 channels covers the signal range of 0.4 to 7.5 megacycles per second.

It is thus seen that the signals are divided into 10 channels in accordance with their range rates of Doppler frequencies and regardless of any other distinction such as range which is determined by other structure of FIG. 1. such as sampler 18.

Output signals from filter 50 are applied to an amplifier of tube 51 which is shown as a video frequency form of amplifier with inductance peaking in the anode load circuit since it must handle frequencies up to the 7.5 megacycle range in one or the other of the ten channels.

The sinusoidal burst signals are converted into unipolar video by detector 52 which is followed by a filter circuit consisting of capacitance 53 and resistance 54. As a result of detection, the signal existing at the common junction point of detector 52, capacitance 53 and resistance 54 will be of negative polarity and of an amplitude dependent upon the amplitude of the signal in the output of filter 50 as amplified by amplifier 51. This basically negative unipolar signal is delivered to several places. First, it is delivered to the tube 55 which together with tube 56 constitutes a Schmitt trigger circuit whose threshold is controllable by variable resistance 57. A second place to which the detected signal from 52 is delivered is an amplitude sensing structure of diodes 58, 59, and zener diode 60 which is connected to the detector through resistance 61. This amplitude detecting circuit is controlled by the Schmitt trigger circuit of tubes 55 and 56 in such manner as to adjust the bias of a variable gain amplifier 62, the grid of which amplifier is connected by a capacitance 63 to the output of filter 50. Amplifier 62 is typically a remote cutoff pentode whose overall gain characteristics are dependent upon the DC bias maintained at the control grid. With substantially zero detected voltage output from detector 52, the grid of tube 55 is above cutoff voltage and with tube 55 then conductive to a substantial extent the low potential at the anode thereof holds the grid of tube 56 below cutoff. This results in the potential at the anode of tube 56 being substantially equal to that of the positive supply. Under this condition the breakdown voltage of the zener diode 60 is exceeded so that conduction from the positive supply through the anode load resistor of tube 56, zener diode 60, and diodes 59 and 58 occurs. With diode 58 thus conductive, the potential at the junction of diodes 58 and 59 is clamped at substantially ground potential, which potential is maintained at the grid of tube 62 by virture of the connection through resistance 64 and which produces high gain to filter output signals applied to the grid of tube 62 through capacitance 63.

In another condition of the circuit, with a large amplitude output from filter 50, a large negative potential is developed across capacitance 53 which reduces conduction in tube 55, raising the anode potential thereof and bringing tube 56 to conduction. This results in a lowered potential at the anode of tube 56 which potential will no longer exceed the zener breakdown voltage of zener diode 60 so that conduction through diodes 59 and 58 and clamping of the diode junction to ground no longer occurs. With diodes 58 and 59 thus effectively removed from the circuit, the grid of tube 62 is then biased through resistance 61 by the negative potential developed across capacitance 53, the magnitude of which is dependent upon signal amplitude. This potential can be quite large so that a heavy negative bias can be maintained on amplifier 62 to result in low amplification of the filtered signals applied to tube 62 through capacitance 63.

In addition to the two previously described limiting conditions of the gain controlled circuit it is apparent that the potential across capacitance 53 is, for all practical purposes, always substantially proportional to the output of the filter 50, considering, of course, the amplification factor of the intervening circuitry. Thus the potential across capacitance 53 will vary in magnitude so that for intermediate amplitude signals it will be possible for an intermediate bias magnitude to be supplied through resistances 61 and 64 to the grid of tube 62. Variable gain control of tube 62 is thus possible over a region being controllable as to maximum gain by the adjustment threshold of the Schmitt circuit of tubes 55 and 56 with resistance 57 so that upon occurrence of small signals in the filter output as would be expected of signals in the 1800 mile region, for example, the maximum gain capabilities of the amplifier 62 can be realized.

In general the time constant characteristics of the filter circuit 53 and 54 should be short, so that the circuit is capable of responding satisfactorily to the bandwidth capabilities of the filter circuit 50 or whatever other limiting bandwidths might be present in other portions of the overall apparatus of FIGS. 1 and 2. Thus it is apparent that the time constant of this circuit will definitely be in the short category.

Just as the input to the circuit of FIG. 3 from storage 10 is divided into 10 channels by filters 50 and the like, the outputs of these 10 channels are combined by an arrangement with the combiner tubes such as 62 and its equivalent in other channels having a common anode load resistance 65 and peaking inductance 66. With the output of all 10 channels thus combined into a single line, coupling to the analysis component 19 of FIG. 1 is effected by some suitable coupling device indicated as capacitance 67.

The resulting operation of apparatus portions of FIG. 1 prior to component 40 as well as subsequent thereto is substantially the same as that of the basic apparatus in FIG. 1 itself. The elimination of large amplitude signals by channeling in the automatic gain control apparatus of FIG. 3 provides a substantial reduction in the blanketing of the more distant signals by closer signals.

Obviously many modifications and variations of the present invention are possible in the light of the above teachings. It is therefore to be understood that within the scope of the appended claims the invention may be practiced otherwise than as specifically described.

What is claimed is:

1. In a velocity sensitive type radar system,
   a plurality of frequency selective filters for separating on a basis of frequency the radar return signals which are shifted in frequency as a result of motion of objects producing the return signals,
   a plurality of means, one for each filter and each individually connected to a filter, for deriving individual control signals in dependency on the amplitude of the output signal of said connected filter, each of said means for deriving including a diode network which is conductive only in response to a small amplitude output signal from said connected filter,
   a plurality of variable gain amplifier means, one for each filter and each individually connected to a filter and responsive to the corresponding control signal to provide large amplification of the output signal from said connected filter when said diode network is conductive and to provide lesser amplification of the output signal from said connected filter when said diode network is not conductive
   and means for combining the outputs of the variable gain amplifier means into a single output channel for the radar system indicator.

2. In a velocity sensitive type radar system,
   a plurality of frequency selective filters for separating on a basis of frequency the radar return signals which are shifted in frequency as a result of motion of objects producing the return signals,
   a plurality of variable gain signal transmission means, one for each filter and each individually connected to a filter, each transmission means including a diode network which is conductive only in response to a small amplitude output signal from said connected filter, each transmission means further including variable gain amplification means for providing said transmission means output signal and controlled by said diode network to provide large amplification of the output signal from said connected filter when said diode network is conductive and to provide lesser amplification of the output signal from said connected filter when said diode network is not conductive
   and means for combining the outputs of the plurality of transmission means into a single output channel for the radar system indicator.

* * * * *